US012756065B2

(12) United States Patent
Sakitani

(10) Patent No.: US 12,756,065 B2
(45) Date of Patent: Oct. 6, 2026

(54) SEPARATOR FOR NONAQUEOUS ELECTROLYTE SECONDARY BATTERIES, AND NONAQUEOUS ELECTROLYTE SECONDARY BATTERY

(71) Applicant: SANYO Electric Co., Ltd., Kadoma (JP)

(72) Inventor: Nobuhiro Sakitani, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 671 days.

(21) Appl. No.: 18/003,019

(22) PCT Filed: Jun. 16, 2021

(86) PCT No.: PCT/JP2021/022951

§ 371 (c)(1),
(2) Date: Dec. 22, 2022

(87) PCT Pub. No.: WO2022/004396

PCT Pub. Date: Jan. 6, 2022

(65) Prior Publication Data

US 2023/0261321 A1 Aug. 17, 2023

(30) Foreign Application Priority Data

Jun. 29, 2020 (JP) ................................ 2020-111486

(51) Int. Cl.
*H01M 50/446* (2021.01)
*H01M 50/491* (2021.01)

(52) U.S. Cl.
CPC ....... *H01M 50/446* (2021.01); *H01M 50/491* (2021.01)

(58) Field of Classification Search
CPC .......................... H01M 50/446; H01M 50/491
See application file for complete search history.

(56) References Cited

U.S. PATENT DOCUMENTS

2016/0308185 A1 10/2016 Kondo et al.
2017/0077478 A1 3/2017 Umeyama et al.

FOREIGN PATENT DOCUMENTS

CN 106058122 A 10/2016
CN 111129402 A * 5/2020 ........ H01M 10/0562
(Continued)

OTHER PUBLICATIONS

International Search Report dated Sep. 7, 2021, issued in counterpart International Application No. PCT/JP2021/022951 (2 pages).
(Continued)

*Primary Examiner* — Stephan J Essex
(74) *Attorney, Agent, or Firm* — WHDA, LLP

(57) ABSTRACT

A separator for nonaqueous electrolyte secondary batteries according to one embodiment of the present disclosure comprises a porous base material and a heat-resistant porous film that is arranged on at least one surface of the porous base material so as to face an electrode of a nonaqueous electrolyte secondary battery. The heat-resistant porous film contains a filler and a binder; and at least a part of a facing part A of the heat-resistant porous film, said facing part A facing the edge portion of the electrode, has a higher binder content than a facing part B of the heat-resistant porous film, said facing part B facing the central portion of the electrode.

4 Claims, 2 Drawing Sheets

(56) References Cited

FOREIGN PATENT DOCUMENTS

| | | | |
|---|---|---|---|
| JP | 2014-203583 | A | 10/2014 |
| JP | 2015-18600 | A | 1/2015 |
| JP | 2016-201327 | A | 12/2016 |
| JP | 2017-54725 | A | 3/2017 |

OTHER PUBLICATIONS

Office Action dated Jul. 23, 2026, issued in counterpart CN Application No. 202180044390.0, with partial English translation. (9 pages).

* cited by examiner

SEPARATOR FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/022951 filed on Jun. 16, 2021 which claims the benefit of priority under 35 U.S.C. § 119(a) of Japanese Patent Application No. 2020-111486 filed in Japan on Jun. 29, 2020, the contents of which are incorporated herein by reference.

TECHNICAL FIELD

The present disclosure relates to a separator for a non-aqueous electrolyte secondary battery and a non-aqueous electrolyte secondary battery.

BACKGROUND

In recent years, as a secondary battery having a high output and a high energy density, a non-aqueous electrolyte secondary battery including an electrode assembly in which a positive electrode and a negative electrode are disposed so as to face each other with a separator interposed therebetween.

For example, Patent Literature I discloses a non-aqueous electrolyte secondary battery including an electrode assembly in which a positive electrode and a negative electrode are disposed so as to face each other with a separator interposed therebetween, in which the separator includes a porous substrate and a heat-resistant porous film disposed on at least one surface of the porous substrate, and a porosity of the heat-resistant porous film is 55% or more.

CITATION LIST

Patent Literature

Patent Literature 1: JP 2015-18600 A

SUMMARY

Technical Problem

The heat-resistant porous film of the separator has a problem that rubbing with the electrode (in particular, an edge portion of the electrode) occurs and a part thereof slides down from the porous substrate. In addition, when a content of a binder is increased in order to suppress the sliding down of the heat-resistant porous film, the binder blocks pores of the porous substrate, which causes deterioration of charge and discharge cycle characteristics.

Therefore, an object of the present disclosure is to provide a separator for a non-aqueous electrolyte secondary battery and a non-aqueous electrolyte secondary battery that can suppress deterioration of charge and discharge cycle characteristics and suppress sliding down of a heat-resistant porous film.

Solution to Problem

A separator for a non-aqueous electrolyte secondary battery according to an aspect of the present disclosure includes a porous substrate and a heat-resistant porous film that is disposed on at least one surface of the porous substrate so as to face an electrode of a non-aqueous electrolyte secondary battery. The heat-resistant porous film contains a filler and a binder, and a content of the binder in at least one part of facing parts A of the heat-resistant porous film facing edge portions of the electrode is higher than that in a facing part B of the heat-resistant porous film facing a central portion of the electrode.

In addition, the non-aqueous electrolyte secondary battery according to an aspect of the present disclosure includes the electrode and the separator for a non-aqueous electrolyte secondary battery.

Advantageous Effects of Invention

According to the present disclosure, deterioration of charge and discharge cycle characteristics can be suppressed, and sliding down of the heat-resistant porous film can be suppressed.

DESCRIPTION OF EMBODIMENTS

Hereinafter, embodiments of the present disclosure will be described with reference to the drawings.

Figure 1:
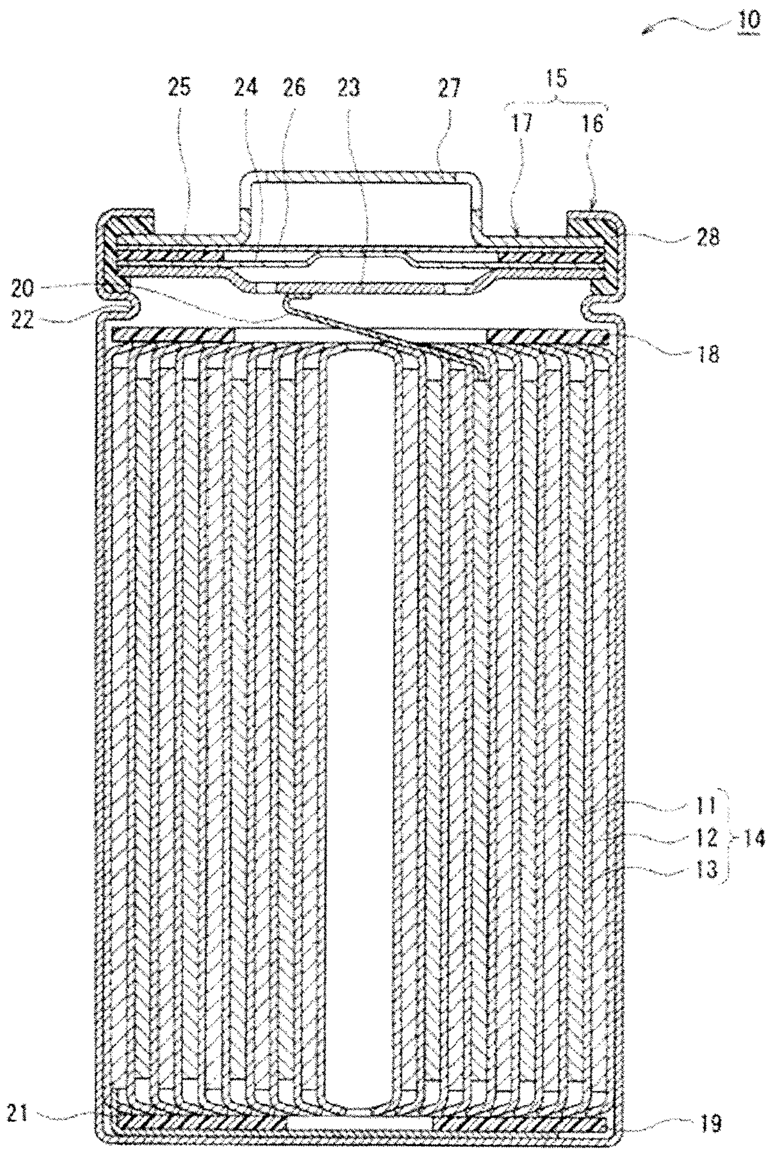
FIG. 1 is a schematic cross-sectional view of a non-aqueous electrolyte secondary battery of an example of an embodiment.

FIG. 1 is a schematic cross-sectional view of a non-aqueous electrolyte secondary battery of an example of an embodiment. Anon-aqueous electrolyte secondary battery 10 illustrated in FIG. 1 includes a wound electrode assembly 14 formed by wounding a positive electrode 11 and a negative electrode 12 with a separator 13 interposed between the positive electrode and the negative electrode, a non-aqueous electrolyte, insulating plates 18 and 19 that are disposed on upper and lower sides of the electrode assembly 14, respectively, and a battery case 15 housing the members. The battery case 15 includes a bottomed cylindrical case main body 16 and a sealing assembly 17 for closing an opening of the case main body 16. Note that a stacked electrode assembly in which a positive electrode and a negative electrode are alternately stacked with a separator interposed therebetween may be applied instead of the wound electrode assembly 14. In addition, examples of the battery case 15 include a metal case having a cylindrical shape, a square shape, a coin shape, a button shape, or the like, and a pouch type case formed by laminating resin sheets.

The case main body 16 is, for example, a bottomed cylindrical metal container. A gasket 28 is provided between the case main body 16 and the sealing assembly 17 to secure a sealing property of the inside of the battery. The case main body 16 has, for example, a projection part 22 in which a part of a side part thereof projects inside for supporting the sealing assembly 17. The projection part 22 is preferably formed in an annular shape along a circumferential direction of the case main body 16, and supports the sealing assembly 17 on an upper surface thereof.

The sealing assembly 17 has a structure in which a filter 23, a lower vent member 24, an insulating member 25, an upper vent member 26, and a cap 27 are sequentially stacked from the electrode assembly 14 side. Each member constituting the sealing assembly 17 has, for example, a disk shape or a ring shape, and the respective members except for the insulating member 25 are electrically connected to each other. The lower vent member 24 and the upper vent member 26 are connected to each other at the respective central parts thereof, and the insulating member 25 is interposed between the respective circumferential parts of the vent members 24 and 26. When the internal pressure of the secondary battery 10 is increased by heat generation due to an internal short circuit or the like, for example, the lower vent member 24 is deformed so as to push the upper vent member 26 up toward the cap 27 side and is broken, and thus, a current pathway between the lower vent member 24 and the upper vent member 26 is cut off. When the internal pressure is further increased, the upper vent member 26 is broken, and gas is discharged through the opening of the cap 27.

In the non-aqueous electrolyte secondary battery 10 illustrated in FIG. 1, a positive electrode lead 20 attached to the positive electrode 11 extends through a through-hole of the insulating plate 18 toward a side of the sealing assembly 17, and a negative electrode lead 21 attached to the negative electrode 12 extends through the outside of the insulating plate 19 toward the bottom side of the case main body 16. The positive electrode lead 20 is connected to a lower surface of the filter 23 that is a bottom plate of the sealing assembly 17 by welding or the like, and the cap 27 that is a top plate of the sealing assembly 17 electrically connected to the filter 23 becomes a positive electrode terminal. The negative electrode lead 21 is connected to a bottom inner surface of the case main body 16 by welding or the like, and the case main body 16 becomes a negative electrode terminal.

The positive electrode 11 includes, for example, a positive electrode current collector and a positive electrode active material layer provided on the positive electrode current collector. As the positive electrode current collector, for example, a foil of a metal stable in a potential range of the positive electrode, such as aluminum, a film in which the metal is disposed on a surface layer, or the like can be used. In addition, it is preferable that the positive electrode active material layer contains a positive electrode active material and contains a conductive agent or a binder.

Examples of the positive electrode active material include lithium-transition metal composite oxides. Specifically, lithium cobaltate, lithium manganate, lithium nickelate, lithium nickel manganese composite oxide, lithium nickel cobalt composite oxide, and the like can be used, and Al, Ti, Zr, Nb, B, W, Mg, Mo, and the like may be added to these lithium-transition metal composite oxides.

As the conductive agent, carbon powders such as carbon black, acetylene black, Ketjen black, and graphite may be used alone or in combination of two or more thereof.

Examples of the binder include a fluorine-based resin such as polytetrafluoroethylene (PTFE) or polyvinylidene fluoride (PVdF), polyacrylonitrile (PAN), a polyimide-based resin, an acrylic resin, and a polyolefin-based resin. These materials may be used alone or in combination of two or more thereof.

The negative electrode 12 includes, for example, a negative electrode current collector and a negative electrode active material layer provided on the negative electrode current collector. As the negative electrode current collector, for example, a foil of a metal stable in a potential range of the negative electrode, such as copper, a film in which the metal is disposed on a surface layer, or the like can be used. In addition, it is preferable that the negative electrode active material layer contains a negative electrode active material and contains a binder and the like.

As the negative electrode active material, a carbon material capable of occluding and releasing lithium ions can be used, and in addition to graphite, non-graphitizable carbon, graphitizable carbon, fibrous carbon, coke, carbon black, and the like can be used. Furthermore, as a non-carbon-based material, silicon, tin, and a metal or an oxide mainly containing silicon and tin can be used.

Examples of the binder include a fluorine-based resin, PAN, a polyimide-based resin, an acrylic resin, a polyolefin-based resin, styrene-butadiene rubber (SBR), nitrile-butadiene rubber (NBR), carboxymethyl cellulose (CMC) or a salt thereof, polyacrylic acid (PAA) or a salt thereof, and polyvinyl alcohol (PVA). These materials may be used alone or in combination of two or more thereof.

Figure 2:
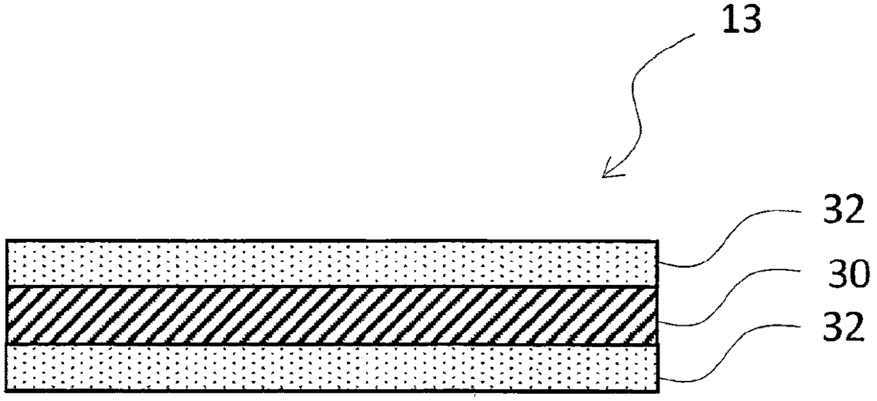
FIG. 2 is a schematic cross-sectional view of a separator of an example of an embodiment.

FIG. 2 is a schematic cross-sectional view of a separator of an example of an embodiment. The separator 13 illustrated in FIG. 2 includes a porous substrate 30 and a heat-resistant porous film 32 disposed on each of both surfaces of the porous substrate 30. Therefore, the heat-resistant porous film 32 disposed on one surface of the porous substrate 30 faces (is in contact with) the positive electrode 11, and the heat-resistant porous film 32 disposed on the other surface of the porous substrate 30 faces (is in contact with) the negative electrode 12. The separator 13 is designed to have a larger width and length than those of the electrode (the positive electrode 11 or the negative electrode 12) in order to prevent a short circuit between the positive and negative electrodes. Therefore, when the electrode and the separator 13 are overlapped in producing the electrode assembly 14, the separator 13 protrudes from the electrode. Note that the heat-resistant porous film 32 may be disposed on at least one surface of the porous substrate 30.

The porous substrate 30 is a porous sheet having an ion permeation property and an insulation property, and is formed of, for example, a microporous thin film, a woven fabric, a non-woven fabric, or the like. A material of the porous substrate 30 is not particularly limited, and examples thereof include polyethylene, polypropylene, a polyolefin such as a copolymer of polyethylene and an α-olefin, an acrylic resin, polystyrene, polyester, and cellulose. The porous substrate 30 may have a single-layered structure or a multi-layered structure. A thickness of the porous substrate 30 is not particularly limited, and is preferably, for example, in a range of 3 μm to 20 μm.

A porosity of the porous substrate 30 is preferably, for example, in a range of 30% to 70%, from the viewpoint of a lithium ion permeation property. The porosity of the porous substrate 30 is measured by the following method.

(1) 10 portions of a substrate are punched into a circular shape having a diameter of 2 cm, and a thickness h and a mass w of the central portion of the punched small piece of the substrate are measured.

(2) A volume V and a mass W of 10 small pieces are obtained from the thickness h and the mass w, and a porosity E is calculated by the following equation.

$$\text{Porosity } \varepsilon(\%) = ((\rho V - W)/(\rho V)) \times 100$$

ρ: Density of material forming substrate

An average pore diameter of the porous substrate 30 is preferably, in a range of 0.02 pinto 0.5 μm, and is more preferably, in a range of 0.03 μm to 0.3 μm. The average pore diameter of the porous substrate 30 is measured using a perm-porometer (manufactured by SEIKA CORPORATION) capable of measuring a fine pore diameter by a bubble point method (JIS K3832, ASTM F316-86).

The heat-resistant porous film 32 contains a filler and a binder. Since the separator 13 includes the heat-resistant porous film 32, for example, an internal stress of the separator 13 that is increased when the temperature rises is relaxed, such that an effect of suppressing a thermal shrinkage of the separator 13 can be obtained. As a result, for example, induction of a short circuit between the positive and negative electrodes can be prevented. A thickness of the heat-resistant porous film 32 is not particularly limited, and is preferably, for example, in a range of 1 μm to 10 μm.

When a filler is contained in the heat-resistant porous film 32, for example, the effect of suppressing a thermal shrinkage can be imparted to the heat-resistant porous film 32. For example, a melting point or a thermal softening point of the filler is preferably 150° C. or higher and more preferably 200° C. or higher. Examples of the filler include metal oxide particles, metal nitride particles, metal fluoride particles, and metal carbide particles. Examples of the metal oxide particles include aluminum oxide, titanium oxide, magnesium oxide, zirconium oxide, nickel oxide, silicon oxide, and manganese oxide particles. Examples of the metal nitride particles include titanium nitride, boron nitride, aluminum nitride, magnesium nitride, and silicon nitride particles. Examples of the metal fluoride particles include aluminum fluoride, lithium fluoride, sodium fluoride, magnesium fluoride, calcium fluoride, and barium fluoride particles. Examples of the metal carbide particles include silicon carbide, boron carbide, titanium carbide, and tungsten carbide particles. In addition, the filler may be porous aluminosilicate such as zeolite ($M_{2/n}O \cdot Al_2O_3 \cdot xSiO_2 \cdot yH_2O$, M is a metal element, $x \geq 2$, $y \geq 0$) or the like, layered silicate such as talc ($Mg_3Si_4O_{10}(OH)_2$) or the like, or a mineral such as barium titanate ($BaTiO_3$), strontium titanate ($SrTiO_3$), or the like. Note that these materials may be used alone or in combination of two or more thereof.

A BET specific surface area of the filler is not particularly limited, and for example, is preferably in a range of 1 $m^2/g$ to 20 $m^2/g$, and is more preferably in a range of 3 $m^2/g$ to 15 $m^2/g$. An average particle size of the filler is not particularly limited, and for example, is preferably 0.1 μm to 5 μm, and is more preferably in a range of 0.2 μm to 1 μm.

The binder has a function of bonding the individual fillers to each other and the filler to the porous substrate 30. Peel strength between the porous substrate 30 and the heat-resistant porous film 32 is improved by the binder. Examples of the binder include a fluorine-based resin such as polyvinylidene fluoride (PVDF) or polytetrafluoroethylene (PTFE), a polyimide-based resin, an acrylic resin, a polyolefin-based resin, styrene-butadiene rubber (SBR), nitrile-butadiene rubber (NBR), carboxymethyl cellulose (CMC) or a salt thereof, polyacrylic acid (PAA) or a salt thereof, and polyvinyl alcohol (PVA). These materials may be used alone or in combination of two or more thereof.

Figure 3:
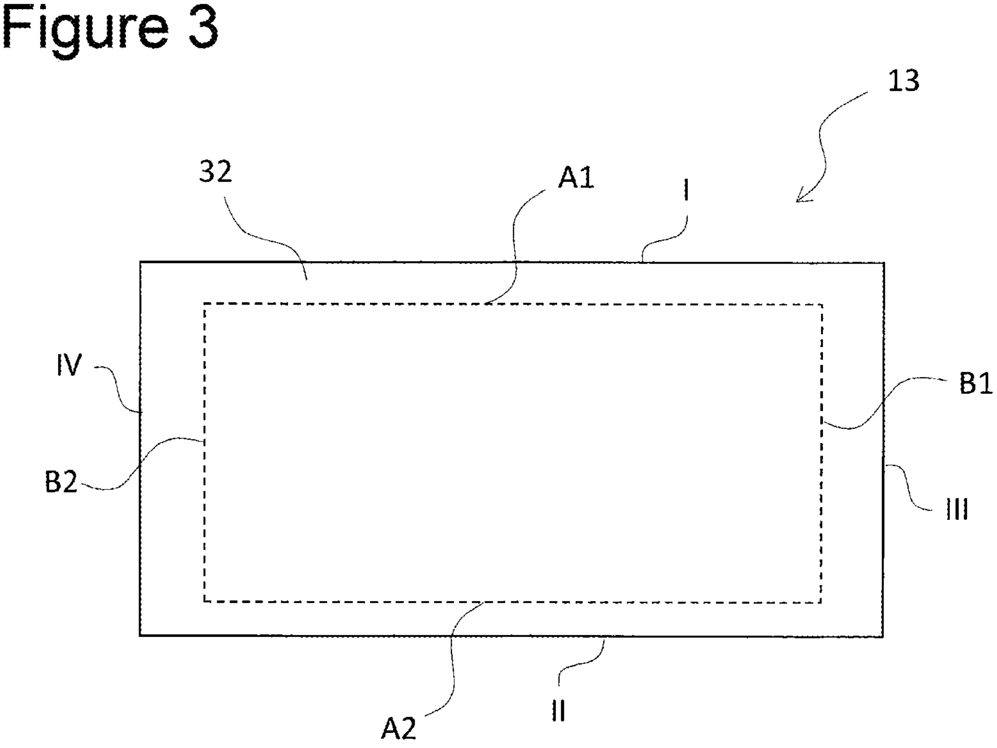
FIG. 3 is a schematic plan view of a separator of an example of an embodiment.

FIG. 3 is a schematic plan view of a separator of an example of an embodiment. The separator 13 illustrated in FIG. 3 shows a state before the wound electrode assembly 14 is formed. The wound electrode assembly 14 is obtained by disposing the positive electrode 11 on one surface of the separator 13 and the negative electrode 12 on the other surface of the separator 13 and winding these electrodes in a longitudinal direction.

The broken line frame illustrated in FIG. 3 is an outer shape of the electrode when the electrode (the positive electrode or the negative electrode) is disposed on the surface of the heat-resistant porous film 32 of the separator 13. Therefore, one side of the broken line frame illustrated in FIG. 3 indicates a facing part A1 of the heat-resistant porous film 32 facing the one edge portion of the electrode (the positive electrode or the negative electrode) disposed on the surface of the heat-resistant porous film 32 in a lateral direction (that is, one edge portion extending in the longitudinal direction), and the other side of the broken line frame indicates a facing part A2 of the heat-resistant porous film 32 facing the other edge portion of the electrode disposed on the surface of the heat-resistant porous film 32 in the lateral direction.

In addition, one side of the broken line frame illustrated in FIG. 3 indicates a facing part B1 of the heat-resistant porous film 32 facing the one edge portion of the electrode disposed on the surface of the heat-resistant porous film 32 in the longitudinal direction (that is, one edge portion extending in the lateral direction), and the other side of the broken line frame indicates a facing part B2 of the heat-resistant porous film 32 facing the other edge portion of the electrode disposed on the surface of the heat-resistant porous film 32 in the longitudinal direction. In addition, in FIG. 3, the reference sign I indicates one edge portion of the heat-resistant porous film 32 in the lateral direction, the reference sign II indicates the other edge portion of the heat-resistant porous film 32 in the lateral direction, the reference sign III indicates one edge portion of the heat-resistant porous film 32 in the longitudinal direction, and the reference sign IV indicates the other edge portion of the heat-resistant porous film 32 in the longitudinal direction.

Here, a content of the binder in at least one part of the facing parts (A1, A2, B1, and B2) of the heat-resistant porous film 32 is higher than that in the facing part of the heat-resistant porous film 32 facing the central portion of the electrode. In other words, the content of the binder in the facing part of the heat-resistant porous film 32 facing the central portion of the electrode is lower than that in the at least one part of the facing parts (A1, A2, B1, and B2) of the heat-resistant porous film 32. The central portion of the electrode is the central portion of the electrode in the longitudinal direction and the lateral direction.

The sliding down of the heat-resistant porous film 32 occurs due to rubbing with the electrode, and occurs mainly due to rubbing with the edge portion of the electrode. Therefore, the facing parts (A1, A2, B1, and B2) of the heat-resistant porous film 32 facing the edge portion of the electrode are likely to slide down. However, in the present embodiment, since the content of the binder in at least one part of the facing parts (A1, A2, B1, and B2) of the heat-resistant porous film 32 facing the edge portion of the electrode is higher than that in the facing part of the heat-resistant porous film 32 facing the central portion of the electrode, the heat-resistant porous film 32 at the facing part has high adhesion. Therefore, it is considered that sliding down of the heat-resistant porous film 32 is suppressed even when rubbing with the edge portion of the electrode occurs. On the other hand, since the content of the binder in the facing part of the heat-resistant porous film 32 facing the central portion of the electrode is lower than that in at least one part of the facing parts (A1, A2, B1, and B2) of the heat-resistant porous film 32, blocking of the pores of the porous substrate 30 due to the binder is suppressed. Thus, it is considered that the movement of the non-aqueous electrolyte during charging and discharging is less likely to be inhibited, such that the deterioration of the charge and discharge cycle characteristics is suppressed.

The facing part of the heat-resistant porous film 32 having a higher content of the binder than that in the facing part of the heat-resistant porous film 32 facing the central portion of the electrode may be at least one of the facing parts A1, A2, B1, and B2, or may be at least one of a part of the facing part A1, a part of the facing part A2, a part of the facing part B1, and a part of the facing part B2.

In the case of the wound electrode assembly, since a plurality of strip-shaped electrodes are usually formed by cutting one electrode sheet along the longitudinal direction, burrs are easily generated at the edge portion of the electrode in the lateral direction (that is, the edge portion extending in the longitudinal direction). Therefore, in the case of the wound electrode assembly, it is preferable that the content of the binder in the facing parts A1 and A2 of the heat-resistant porous film 32 facing the edge portion of the electrode in the lateral direction is higher than that in the facing part of the heat-resistant porous film facing the central portion of the electrode.

In the case of the stacked electrode assembly or the like, since a plurality of electrodes are formed by punching one electrode sheet into a predetermined shape (a rectangle, a circle, or the like), burrs are likely to be generated throughout the edge portion of the electrode. Therefore, in the case of the stacked electrode assembly, it is preferable that the content of the binder in all of the facing parts of the heat-resistant porous film 32 facing the edge portion of the electrode is higher than that in the facing part of the heat-resistant porous film 32 facing the central portion of the electrode.

The above is just an example, and in a case of any electrode assembly, the content of the binder in at least one part of the facing parts of the heat-resistant porous film 32 facing the edge portion of the electrode may be higher than that in the facing part of the heat-resistant porous film 32 facing the central portion of the electrode.

In addition, the content of the binder contained in the heat-resistant porous film 32 may be increased stepwise or continuously from the facing part of the heat-resistant porous film 32 facing the central portion of the electrode toward the facing part of the heat-resistant porous film 32 facing the edge portion of the electrode. In addition, the content of the binder contained in the heat-resistant porous film 32 may be increased or decreased stepwise or continuously from the facing part of the heat-resistant porous film 32 facing the edge portion of the electrode toward the edge portion of the heat-resistant porous film 32, or may be the same without change.

It is preferable that the content of the binder contained in at least one part of the facing parts of the heat-resistant porous film 32 facing the edge portion of the electrode is, for example, in a range of 5% by mass to 15% by mass, from the viewpoint of effectively suppressing the sliding down of the heat-resistant porous film and the like. In addition, it is preferable that the content of the binder contained in the facing part of the heat-resistant porous film 32 facing the central portion of the electrode is, for example, in a range of 1% by mass to 10% by mass, from the viewpoint of effectively suppressing a reduction of a charge and discharge cycle of the non-aqueous electrolyte secondary battery and the like.

An example of a method for producing the separator 13 will be described. A first slurry containing a filler, a binder, and the like is prepared. In addition, similarly to the first slurry, a second slurry containing a filler, a binder, and the like and having a higher content of the binder than the first slurry is prepared. Then, for example, the second slurry is applied to the surface of the porous substrate from the edge portion III to the edge portion IV in the longitudinal direction with a width including the facing part A1 from the edge portion I illustrated in FIG. 3, and the second slurry is applied to the surface of the porous substrate from the edge portion III to the edge portion IV in the longitudinal direction with a width including the facing part A2 from the edge portion II illustrated in FIG. 3. In addition, the first slurry is applied to the surface of the porous substrate between the coating spaces of the second slurry. Note that the first slurry and the second slurry may be applied simultaneously or separately. After the application, the separator having a heat-resistant porous film formed on a surface of a porous substrate can be obtained by drying for a predetermined time.

The non-aqueous electrolyte contains a non-aqueous solvent and an electrolyte salt. The non-aqueous electrolyte is not limited to a liquid electrolyte, and may be a solid electrolyte using a gel polymer or the like. As the electrolyte salt, for example, a lithium salt such as LiFSI, LiTFSI, $LiBF_4$, or $LiPF_6$ is used. As the solvent, for example, esters such as ethylene carbonate (EC), propylene carbonate (PC), dimethyl carbonate (DMC), ethyl methyl carbonate (EMC), diethyl carbonate (DEC), methyl acetate (MA), and methyl propionate (MP), ethers, nitriles, amides, and a mixed solvent of two or more thereof are used. The non-aqueous solvent may contain a halogen-substituted product in which at least some hydrogens in the solvent are substituted with halogen atoms such as fluorine.

Examples of the halogen-substituted product include fluorinated cyclic carbonic acid ester such as fluoroethylene carbonate (FEC), fluorinated chain carbonic acid ester, and fluorinated chain carboxylic acid ester such as methyl fluoropropionate (FMP).

Next, Examples will be described.

EXAMPLES

Examples

[Production of Separator]

Titania ($TiO_2$) having a particle size of 0.5 μm, carboxymethyl cellulose (CMC), and styrene-butadiene rubber (SBR) were mixed in a water solvent at a mass ratio of 95:0.5:4.5 using a mixer to prepare a first slurry for a heat-resistant porous film having a solid content of 30%. Titania ($TiO_2$) having a particle size of 0.5 μm, carboxymethyl cellulose (CMC), and styrene-butadiene rubber (SBR) were mixed in a water solvent at a mass ratio of 95:0.5:9.5 using a mixer to prepare a second slurry for a heat-resistant porous film having a solid content of 30%.

The prepared first slurry and second slurry were applied to both surfaces of a polyethylene porous substrate using a stripe coating machine. Specifically, the second slurry was applied to one surface of the porous substrate from the edge portion III to the edge portion IV in the longitudinal direction with a width including the facing part A1 from the edge portion I illustrated in FIG. 3, and was applied to one surface of the porous substrate from the edge portion III to the edge portion IV in the longitudinal direction with a width including the facing part A2 from the edge portion II illustrated in FIG. 3. In addition, at the time of application of the second slurry, the first slurry was applied to the surface of the porous substrate between the coating spaces of the second slurry. After the application, drying was performed for a predetermined time. Similarly, the first slurry and the second slurry were applied and dried to the other surface of the porous substrate. In this way, a separator in which a heat-resistant porous film was formed on both surfaces of a porous substrate was obtained.

[Production of Positive Electrode]

A positive electrode active material represented by $LiNi_{0.8}Co_{0.15}Al_{0.05}O_2$, acetylene black (AB), and polyvinylidene fluoride (PVDF) having an average molecular weight of 1,100,000 were mixed in an N-methyl-2-pyrrolidone (NMP) solvent at a mass ratio of 98:1:1 to prepare a positive electrode mixture slurry having a solid content of 70%. The positive electrode mixture slurry was applied to both surfaces of an aluminum foil, drying was performed, and then stretching was performed using a roller. In this way, a positive electrode in which a positive electrode active material layer was formed on both surfaces of a positive electrode current collector was obtained. The positive electrode was cut into a strip shape with a predetermined width and used as a positive electrode in Example.

[Production of Negative Electrode]

95 parts by mass of graphite powder, 5 parts by mass of Si oxide, 1 part by mass of carboxymethyl cellulose (CMC), and an appropriate amount of water were mixed, and 1.2 parts by mass of styrene-butadiene rubber (SBR) and an appropriate amount of water were mixed with the mixture, thereby preparing a negative electrode mixture slurry. The negative electrode mixture slurry was applied to both surfaces of a copper foil, drying was performed, and then stretching was performed using a roller. In this way, a negative electrode in which a negative electrode active material layer was formed on both surfaces of a negative electrode current collector was obtained. The negative electrode was cut into a strip shape with a predetermined width and used as a negative electrode in Example.

[Preparation of Non-Aqueous Electrolyte]

5 parts by mass of vinylene carbonate (VC) was added to 100 parts by mass of a mixed solvent obtained by mixing ethylene carbonate (EC) and dimethyl carbonate (DMC) at a volume ratio of 1:3, and $LiPF_6$ was dissolved at 1 mol/liter, thereby preparing a non-aqueous electrolyte.

[Production of Non-Aqueous Electrolyte Secondary Battery]

(1) A positive electrode lead was attached to a positive electrode current collector, and a negative electrode lead was attached to a negative electrode current collector. Then, on one surface of the separator, the separator and the positive electrode were aligned so that the heat-resistant porous film formed of the second slurry faced the edge portion of the positive electrode in the lateral direction, and on the other surface of the separator, the separator and the negative electrode were aligned so that the heat-resistant porous film formed of the second slurry faced the edge portion of the negative electrode in the lateral direction, thereby disposing the separator between the positive electrode and the negative electrode. Thereafter, these components were wound to produce a wound electrode assembly.

(2) Insulating plates were disposed on upper and lower sides of the electrode assembly, respectively, a negative electrode lead was welded to a case main body, a positive electrode lead was welded to a sealing assembly, and the electrode assembly was housed in the case main body.

(3) A non-aqueous electrolyte was injected into the case main body, and then, an end part of an opening of the case main body was sealed with the sealing assembly via a gasket. This was used as a non-aqueous electrolyte secondary battery.

Comparative Example 1

In production of a separator, the first slurry was applied to one surface of the porous substrate from the edge portion III to the edge portion IV in the longitudinal direction with a width including the facing part A1 from the edge portion I shown in FIG. 3, and was applied to one surface of the porous substrate from the edge portion III to the edge portion IV in the longitudinal direction with a width including the facing part A2 from the edge portion II shown in FIG. 3. In addition, at the time of application of the first slurry, the second slurry was applied to the surface of the porous substrate between the coating spaces of the first slurry, and drying was performed for a predetermined time. Similarly, the first slurry and the second slurry were applied and dried to the other surface of the porous substrate. Except for the above, a separator was produced in the same manner as that of Example.

Then, in production of a non-aqueous electrolyte secondary battery, on one surface of the separator, the separator and the positive electrode were aligned so that the heat-resistant porous film formed of the first slurry faced the edge portion of the positive electrode in the lateral direction, and on the other surface of the separator, the separator and the negative electrode were aligned so that the heat-resistant porous film formed of the first slurry faced the edge portion of the negative electrode in the lateral direction, thereby disposing the separator between the positive electrode and the negative electrode. Except for the above, a non-aqueous electrolyte secondary battery was produced in the same manner that of Example.

Comparative Example 2

In production of a separator, a separator was produced in the same manner as that of Example, except that the first slurry was applied to the entire both surfaces of the porous substrate. In addition, a non-aqueous electrolyte secondary battery was produced in the same manner as that of Example using the produced separator.

Comparative Example 3

In production of a separator, a separator was produced in the same manner as that of Example, except that the second slurry was applied to the entire both surfaces of the porous substrate. In addition, a non-aqueous electrolyte secondary battery was produced in the same maimer as that of Example using the produced separator.

[Charge and Discharge Cycle Characteristics]

Each of the non-aqueous electrolyte secondary batteries of Example and Comparative Examples was subjected to constant current charge at a current of 0.3 It up to 4.2 V, and then was subjected to constant voltage charge at 4.2V up to 0.05 It. Then, constant current discharge was performed at a current of 0.5 It up to 2.5 V. The charge and discharge cycle was performed 100 cycles, and a capacity retention rate was determined. The results are summarized in Table 1.

Capacity retention rate (%)=(100th cycle discharge capacity/1st cycle discharge capacity)×100

After the charge and discharge cycle was performed 100 cycles, the non-aqueous electrolyte secondary battery was disassembled, the separator was taken out, and the presence or absence of sliding down of the heat-resistant porous film was visually confirmed. The number of batteries confirmed is 100. The results of the presence or absence of the sliding down of the heat-resistant porous film were summarized in Table 1.

TABLE 1

| | Content of binder in heat-resistant porous film | | | |
|---|---|---|---|---|
| | Facing part facing central portion of electrode | Facing part facing edge portion of electrode | Sliding down of heat-resistant porous film | Capacity retention rate |
| Example | 4.5 wt % | 9.5 wt % | Absence | 91% |
| Comparative Example 1 | 9.5 wt % | 4.5 wt % | Presence | 79% |
| Comparative Example 2 | 4.5 wt % | 4.5 wt % | Presence | 92% |
| Comparative Example 3 | 9.5 wt % | 9.5 wt % | Absence | 78% |

As can be seen from the results in Table 1, in Example 1, the deterioration of the charge and discharge cycle characteristics was suppressed, and the sliding down of the heat-resistant porous film was also suppressed. It is presumed that since the content of the binder in at least one part of the facing parts of the heat-resistant porous film facing the edge portion of the electrode is higher than that in the facing part of the heat-resistant porous film facing the central portion of the electrode, the adhesion of the heat-resistant porous film is improved, and thus the sliding down of the heat-resistant porous film due to rubbing with the edge portion of the electrode and the like is suppressed. In addition, it is presumed that since the content of the binder in the facing part of the heat-resistant porous film facing the central portion of the electrode is lower than that in at least one part of the facing parts of the heat-resistant porous film facing the edge portion of the electrode, the pores of the porous substrate are blocked by the binder and the movement of the non-aqueous electrolyte during charging and discharging is suppressed, such that the deterioration of the charge and discharge cycle characteristics is suppressed.

REFERENCE SIGNS LIST

10 Non-aqueous electrolyte secondary battery
11 Positive electrode
12 Negative electrode
13 Separator
14 Electrode assembly
15 Battery case
16 Case main body

17 Sealing assembly
18, 19 Insulating plate
20 Positive electrode lead
21 Negative electrode lead
22 Projection part
23 Filter
24 Lower vent member
25 Insulating member
26 Upper vent member
27 Cap
28 Gasket
30 Porous substrate
32 Heat-resistant porous film

The invention claimed is:

1. A separator for a non-aqueous electrolyte secondary battery comprising:
a porous substrate; and
a heat-resistant porous film that is disposed on at least one surface of the porous substrate so as to face an electrode of a non-aqueous electrolyte secondary battery,
wherein the heat-resistant porous film contains a filler and a binder, and
a content of the binder in
at least one part of facing parts A of the heat-resistant porous film facing an edge portion of the electrode in a lateral direction, the edge portion located more inwardly than an end of the heat-resistant porous film in the lateral direction, and
at least one part of a facing part B of the heat-resistant porous film facing an edge portion of the electrode in a longitudinal direction, the edge portion located more inwardly than an end of the heat-resistant porous film in the longitudinal direction,
is higher than that in a facing part C of the heat-resistant porous film facing a central portion of the electrode.

2. The separator for a non-aqueous electrolyte secondary battery according to claim 1, wherein
each of the content of the binder relative to the mass of all ingredients contained in the at least one part of the facing parts A of the heat-resistant porous film and the content of the binder relative to the mass of all ingredients contained in the at least one part of the facing part B of the heat-resistant porous film is 5% by mass to 15% by mass, and
the content of the binder relative to the mass of all ingredients contained in the facing part C of the heat-resistant porous film is 1% by mass to 10% by mass.

3. The separator for a non-aqueous electrolyte secondary battery according to claim 1, wherein the heat-resistant porous film is disposed on both surfaces of the porous substrate.

4. A non-aqueous electrolyte secondary battery comprising the electrode and the separator for a non-aqueous electrolyte secondary battery according to claim 1.

* * * * *